Jan. 14, 1930.  H. E. STURTEVANT  1,743,500
CHAIN
Filed June 18, 1923     3 Sheets-Sheet 1
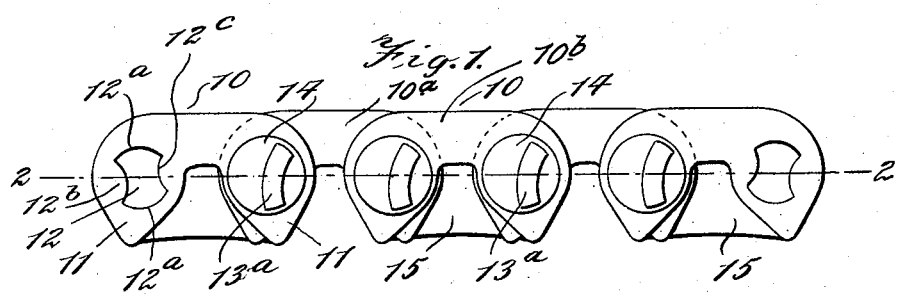
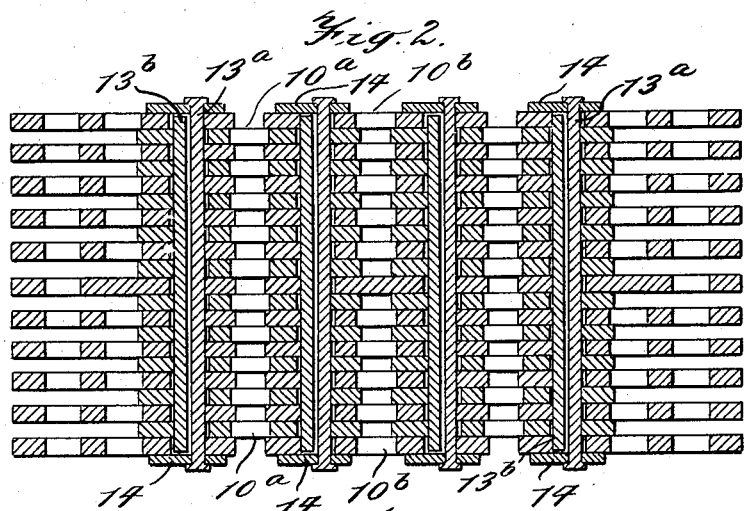
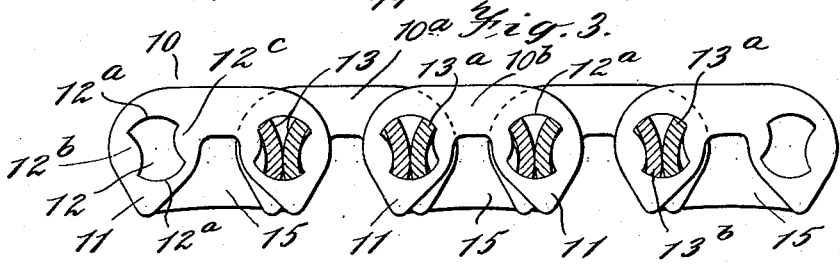
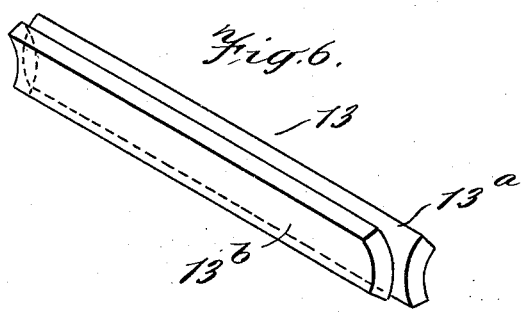
INVENTOR
Harold E. Sturtevant
BY
ATTORNEYS

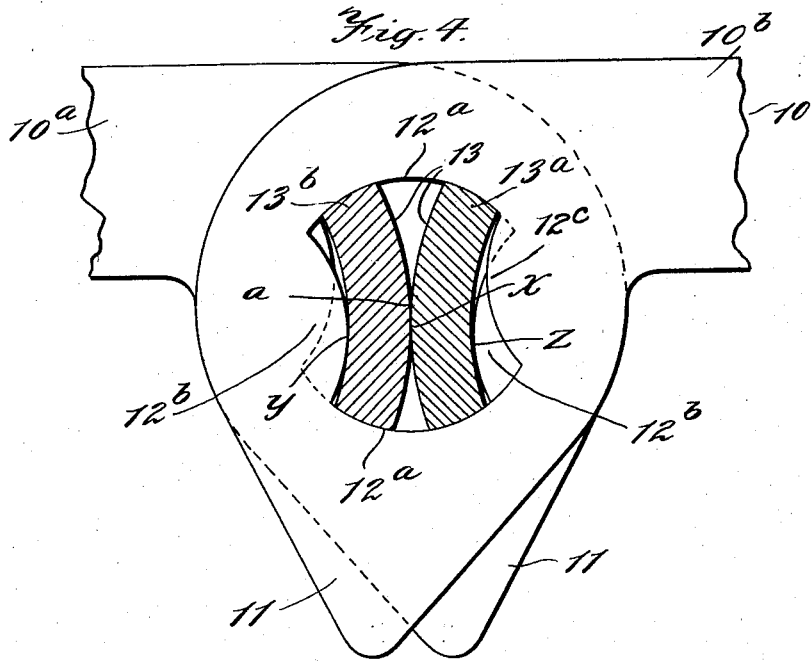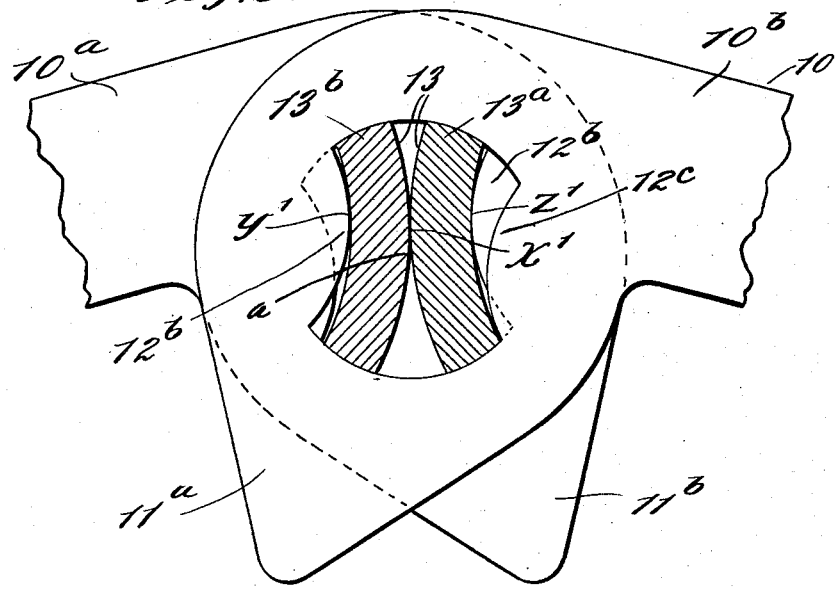

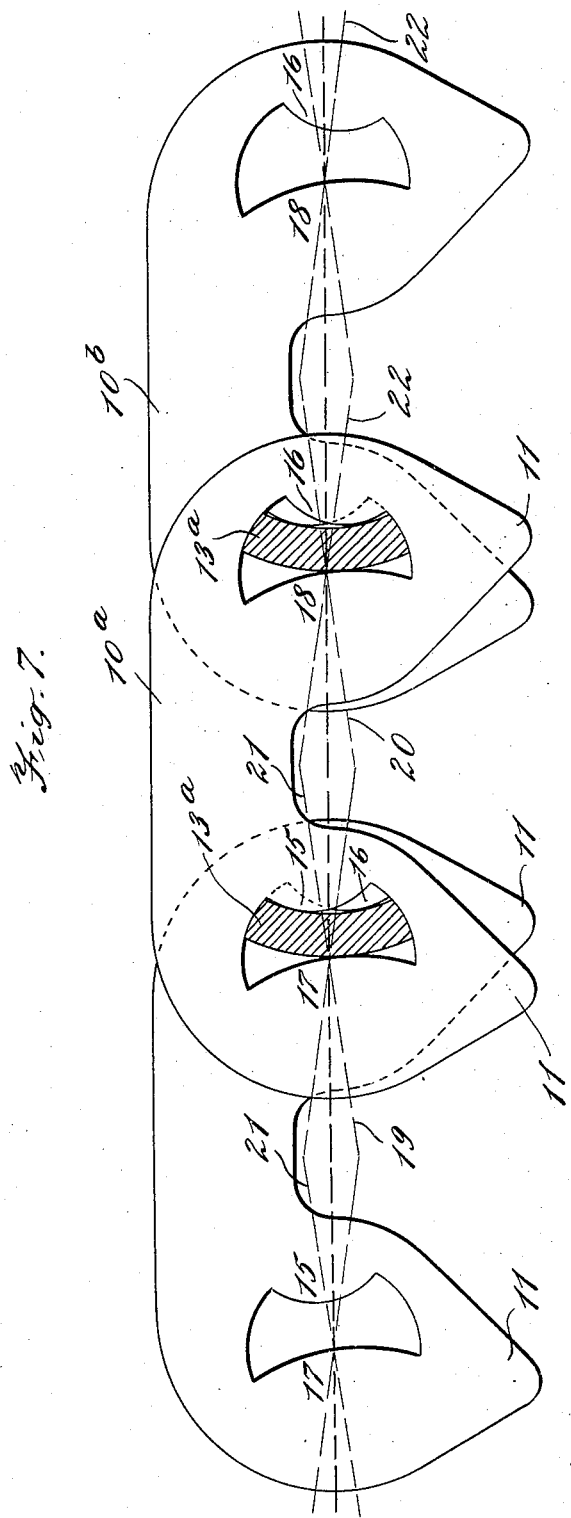

Patented Jan. 14, 1930

1,743,500

UNITED STATES PATENT OFFICE

HAROLD E. STURTEVANT, OF HARTFORD, CONNECTICUT, ASSIGNOR TO THE WHITNEY MFG. CO., OF HARTFORD, CONNECTICUT, A CORPORATION OF CONNECTICUT

CHAIN

Application filed June 18, 1923. Serial No. 646,050.

My invention more particularly relates to a link chain of the silent type which is efficient, durable and quiet in operation.

My invention consists of certain novel parts and combinations of parts particularly pointed out in the claims.

The following is a description of a link chain embodying my invention in the form at present preferred by me, but it will be understood that various modifications and changes may be made therein without departing from the spirit of my invention and without exceeding the scope of my claims.

My invention will best be understood by reference to the accompanying drawings in which I have illustrated the preferred embodiment of my invention, and in which Figure 1 is a side view of a chain; Fig. 2 is an inverted, sectional plan view taken along the plane of the line 2—2 of Fig. 1; Fig. 3 is a side view similar to Fig. 1 but with the end washers removed to illustrate the relative positions of the parts; Fig. 4 is a sectional elevation, on an enlarged scale, illustrating the positions assumed by the links of adjacent pitches and the two-part pin passing therethrough on a straight run of the chain; Fig. 5 is a view similar to Fig. 4 illustrating the joint flexed; Fig. 6 is a perspective view of the two-part pin and Fig. 7 is a side view of a section of a modified chain.

Like reference characters indicate like parts throughout the drawings which are to a scale.

In outline, the links indicated generally at 10 are similar to links heretofore employed in this type of chain, 11 being one of the teeth thereof which engages the teeth of the sprocket wheel over which the chain passes. The links may also correspond in thickness and material to links of this class heretofore used. Each link is provided at each end with an opening 12 which is preferably surrounded by walls in arcs of circles, comprising the concavities $12^a$, above and below and the convexities $12^b$ and $12^c$ on each side.

The links $10^a$ of one pitch are interspersed at their ends with the ends of the links $10^b$ of an adjacent pitch, in the form shown the links of one pitch alternating at their ends with the ends of the links of the adjacent pitch, though it will, of course, be understood that the links may be otherwise grouped or arranged. The links are connected together by a two-part pin 13 which passes through the openings 12, the two parts $13^a$ and $13^b$ of the pin preferably being segmental in form and similar in cross section, the facing and engaging sides of the two members $13^a$ and $13^b$ being convex so that the two parts may roll on each other without substantial friction. The edges of the segmental members $13^a$ and $13^b$ are illustrated as being formed on the same radius as the circular walls $12^a$ of the opening, but it will be understood that the edges of the segmental members may be rounded. The two segments are of a width, from edge to edge, to extend from one circular wall $12^a$ of the opening to the opposite circular wall, a proper clearance between the edges of each part of the pin and the circular walls $12^a$ being provided. The part $13^a$ of the pin takes its bearing on the convex link portions $12^b$ of the links $10^a$ of one pitch, and the part $13^b$ takes its bearing on the convex link portions $12^b$ of the links $10^b$ of an adjacent pitch. When the chain is under tension on a straight run, the two parts $13^a$ and $13^b$ of the pin, and the links of two adjacent pitches, as illustrated by the two links $10^a$ and $10^b$, assume approximately the positions indicated in Figure 4, the two parts $13^a$ and $13^b$ of the pin engaging each other at the point $x$, and the concave surface of the part $13^b$ of the pin engaging the convex link portion $12^b$ at $y$, and also engaging the convex link portions $12^b$ of all the other links of the pitch to which the link $10^b$ belongs, the engagement of the part $13^b$ with the links other than $10^b$ not being shown in Figure 4. Similarly, the part $13^a$ of the pin engages on its concave surface the convex link portion $12^b$ of the link $10^a$ (and the convex link portions $12^b$ of the other links of the same pitch) at the point $z$. The other link portions $12^c$ preferably do not engage the adjacent parts $13^a$ and $13^b$ of the pin, a clearance being provided between these link portions and the parts of the pin, (the link portions 12ᶜ being provided principally for considerations of link strength and appearance). The outer surfaces of the parts 13ᵃ and 13ᵇ of the pin are more flat, i. e., formed on a longer radius than are the surfaces of the link portions 12ᵇ, which they engage, thereby forming a substantial clearance between the pin members 13ᵃ and 13ᵇ and the engaging link portions 12ᵇ near the ends, thereby permitting the two parts of the pin to roll easily on the link portions 12ᵇ without binding and without substantial friction. When the joint is flexed, as in passing around a sprocket, and the parts move to the positions illustrated in Figure 5, the two parts 13ᵃ and 13ᵇ of the pin easily roll on each other and engage each other at a point which is preferably above the center of the opening as at $x'$, whereas the parts engage each other at a point $x$ below the center of the opening on a straight run of the chain, as illustrated in Figure 4. The link portions 12ᵇ, 12ᵇ, of adjacent pitches engage the pin segments 13ᵃ and 13ᵇ at higher points $y'$ and $z'$ when in the flexed position shown in Figure 5 than in the straight run position shown in Figure 4. This results from the fact that the portions 12ᵇ and 12ᶜ are segments of circles whose centers are on a line passing through the pivotal center of the pitch joint and at an angle to a line passing through the adjacent pivotal centers as hereinafter explained in connection with Fig. 7. The free and easy movement of the two parts of the pin on each other and on the link portions 12ᵇ, furthermore, permits flexing of the chain joint in the reverse direction from that taken when the chain passes around a sprocket, a condition that results from the sagging of the upper run of the chain passing between two sprocket wheels, thereby avoiding the noise which is frequently occasioned by this portion of a chain.

One part 13ᵃ of the pin is preferably longer than the other part 13ᵇ and passes slightly beyond the sides of the chain, as illustrated in Figure 2, washers 14 being secured on the ends thereof, the ends of the member 13ᵃ preferably being peened over the washer to retain the same in position. The length of the other part 13ᵇ of the pin is preferably substantially the same as the width of the chain, the part 13ᵇ being retained in position and against longitudinal movement by the washers 14. Guide links 15 are preferably provided along the middle of the chain in the usual manner.

A chain made in accordance with my invention is quiet and efficient in operation, and the rolling parts of the joint practically eliminate surface friction, thereby reducing the wear to a minimum and preventing substantial elongation of the chain.

It will be understood that the relative movement between the pin and the link portions 12ᵇ could be obtained by securing one of the parts of the pin to the links with which it is associated, and obtaining all the movement between the pin and the link portions from the one link member.

The slight resiliency of the pin segments aids to some extent in the ease of operation.

In the preferred form of my invention above described the oscillation of the adjacent pitches around the axis $a$ involves two rolling movements: (1) a rolling movement of the convex link walls 12ᵇ—12ᵇ upon the concave surfaces of the pin segments, (2) a rolling movement of the convex surfaces of the pin segments upon each other.

A less desirable form of my invention may be embodied in a structure containing a pin of only one part or segment. Such an embodiment is indicated in Figure 7 in which the pin segment 13ᵇ is omitted and its convex surface upon which the segment 13ᵃ rolls, is supplied by a convexity 17 on the link. In this case, the two rolling movements are by the convexities 15 and 17 of one link and the convexity 16 of the other link upon opposite sides of the pin segment 13ᵃ.

The link convexities 17, 18, as shown on a straight run in Figure 7, are drawn from centres below the horizontal in lines 19 and 20 forming an angle of about eight degrees with the horizontal. The link convexity 15 is drawn from a centre above the horizontal in line 21 and the link convexity 16 is drawn from a centre below the horizontal in line 22; the lines 21 and 22 also forming angles of about eight degrees with the horizontal. The convexities 17, 18 are of the same radius as the convex surface of the pin 13ᵃ but the convexities 15 and 16 are of a shorter radius.

By striking the portions 12ᵇ and 12ᶜ of Figs. 1 to 6, and portions 15, 16 and 17 of Fig. 7 with their centers on a line at an angle to the horizontal center line of the chain, the bearing surfaces on the pins move from below the center line to above the center line when the joint is flexed. This upward movement of the point of contact as the joint is flexed allows an easing up on the teeth of the sprocket and thus reduces the normal wear between the chain and the sprocket. In the form shown in Fig. 7 it will be noted that the point of contact between 17 and the pin is between the points of contact between 15 and 16 and the pin so that the pull on the chain tends to take the curvature out of the pin and thus adds a small amount of resiliency to the chain. This helps to reduce the noise of the chain.

I claim:

1. In combination with the links of a chain a connection comprising a pin of two segmental parts and two rolling contacts, one being between the pivoting member and the pin and the other between the two parts of the pin.

2. In a chain, a plurality of links provided with openings, and a two-part pin adapted to pass through said openings, the two parts being rollable on each other and at least one of said parts being rollable on link walls around the openings.

3. In a chain, a plurality of links provided with openings, and a two-part pin adapted to pass through said openings, the two parts being rollable on each other and rollable on link walls around said openings.

4. A chain having pitches composed of a plurality of links, each formed with an opening partly defined by a convex link portion, the links of a given pitch being interspersed at one end with the links of an adjacent pitch, and a two-part pin passing through said openings and connecting the links of adjacent pitches, the two parts of said pin being rollable on each other, and the two parts being rollable on said convex link portions of the links of the respective pitches.

5. A chain having pitches composed of a plurality of links, each formed with an opening partly defined by a convex link portion, the links of a given pitch being interspersed at one end with the links of an adjacent pitch, and a two-part pin passing through said openings and connecting the links of adjacent pitches, the two parts of said pin being provided with convex facing and engaging surfaces and with concave surfaces adapted to engage said convex link portions of the links of the respective adjacent pitches.

6. A chain having pitches composed of a plurality of links, each formed with an opening partly defined by a convex link portion, the links of a given pitch being interspersed at one end with the links of an adjacent pitch, and a two-part pin passing through said openings and connecting the links of adjacent pitches, the two parts of said pin being provided with convex facing and engaging surfaces and with concave surfaces adapted to engage said convex link portions of the links of the respective adjacent pitches, the concave surfaces of the parts of the pin being more nearly flat than the convex link portions which they engage.

7. In a chain, a plurality of links provided with openings, and a two-part pin adapted to pass through said openings, the two parts of said pin being similar in cross section and being rollable on each other, and at least one part of said pin being rollable on link walls around said openings.

8. In a chain, a concavo-convex pin member in combination with convex surfaces bearing upon both sides thereof.

9. In a chain, two concavo-convex pin members having their convex surfaces in contact, in combination with convex surfaces bearing upon both sides thereof.

10. In a chain, a concavo-convex pin member in combination with convex surfaces bearing upon both sides thereof and concave surfaces opposed to the edges thereof.

11. In a chain, a concavo-convex pin member in combination with convex surfaces bearing upon both sides thereof; the convex surface bearing upon the concave side of the pin member being of less radius than the surface upon which it bears.

12. In a chain, two concavo-convex pin members having their convex surfaces in contact, in combination with links of adjacent pitches having surfaces whereby both of said pins are oscillated.

13. In a chain, two concavo-convex pin members having their convex surfaces in contact and one being shorter than the other and means whereby the ends of the longer are held.

HAROLD E. STURTEVANT.